United States Patent Office 3,400,669
Patented Sept. 10, 1968

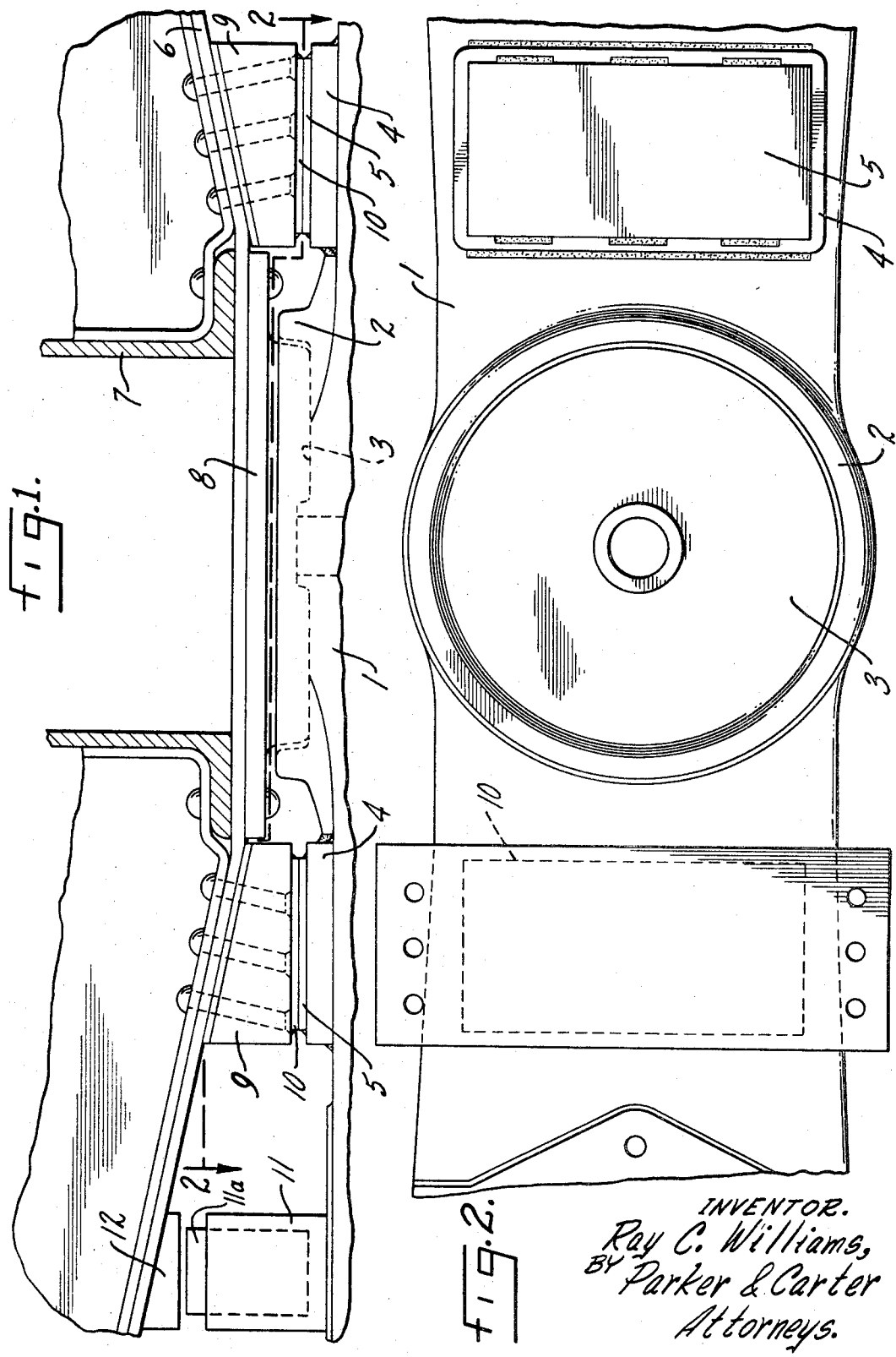

3,400,669
RAILWAY CAR CENTER PLATE AND AUXILIARY BEARINGS
Ray C. Williams, Chicago, Ill., assignor to Standard Car Truck Company, Chicago, Ill., a corporation of New Jersey
Filed Apr. 18, 1966, Ser. No. 543,393
2 Claims. (Cl. 105—199)

ABSTRACT OF THE DISCLOSURE

In a railroad car, center plates between the car body and the car truck, normally unloaded side bearings adjacent opposite sides of the truck, a pair of auxiliary, rigid, stabilizing pads extending across the bolsters, having load bearing surfaces on opposite sides of the center plates and so disposed that as the car and truck rotate with respect to one another about the vertical axis of the center plate, the load carried by the stabilizing pad bearing surfaces on opposite sides of the truck remain equal. As the car tilts toward contact with the heavy side bearing, the load of the car is concentrated on the stabilizing pad on the heavy side of the truck and as the bearing surfaces of center plates and light side pads separate, the load of the car exerts an anti-tilt effect through the lever arm equal to the distance between the vertical axis of the center plates and the point of application of the car load on the heavy side pad, such situation prevailing until the heavy side bearing picks up the load.

---

This invention relates to improvements in railroad freight car trucks and especially to means supplementary to the center plate to add to the stability of the car.

The railroad freight car truck carries a circular center plate which is engaged by and supports a circular center plate on the car. One is male, the other female so as to permit angular movement of car and truck about a vertical axis as the car travels along the track. The truck center plate includes an annular upwardly extending wall, the surface of the plate inside the wall being in a horizontal plane. The freight car has a center plate which fits into the truck plate and terminates in a horizontal plane load bearing surface in contact with the truck plate. The result is that the load carried by the center plate is uniform per square inch throughout.

Because freight cars must be free to be moved over tracks across switches and the like, the center plate must permit a relatively wide angular displacement and must therefore as a matter of engineering design be of relatively small diameter with respect to the truck width.

Side bearings between the car and truck are provided usually out of contact when the car is upright to positively limit tilt of the car with respect to the truck.

This invention provides between the truck and the car, adjacent and outside of the center plates opposed auxiliary, stabilizing pads which have planar, horizontal wear plates which are so positioned and so spaced that they carry part of the load of the truck. The design is such that the pressure per square inch on the wear plates on both sides of the center plate and on the center plate is substantially the same.

The wear plates are parallel with the load bearing surfaces on the center plates and as the car rotates about the vertical axis with respect to the truck, these wear plates continue to support the load of the car. The wear plates extend across the bolster on the truck and as the car rotates about the vertical axis, the areas of contact between the wear plates vary, thus equally changing the load carrying areas on opposite side of the center plates to still provide substantial load carrying ability on both of the wear plates.

Thus whether the car is upright on the truck or inclined to it, the radius between the central axis of the center plate and the auxiliary wear plates and the point of load application on the auxiliary plates is wide enough to substantially increase the stability of the car.

Under these circumstances, as the car tilts toward contact with the side bearings, the center plate and wear plates being substantially rigid, the load will be concentrated on the auxiliary stabilizing wear plate area nearest to the side bearings on the down side at a radius much further from the center line of the center plate than the radius of the center plates.

The invention is illustrated more or less diagrammatically in the accompanying drawings, wherein—

FIGURE 1 is a side view of a portion of a bolster embodying this invention with unessential parts omitted;
FIGURE 2 is a section along the line 2—2 of FIGURE 1.

Like parts are indicated by like numerals throughout the specification and drawings.

The details of the truck and car form no part of the present invention and are not illustrated.

The truck bolster 1 is mounted on a railroad truck in the usual manner. The truck bolster carries a female center plate which includes an annular wall 2, a horizontal bearing surface 3, bounded by the wall 2, a pad 4 which carries an auxiliary load bearing wear plate 5 parallel with the female center plate bearing surface 3.

The car body includes the car bolster 6, and the center sill 7 as integral parts of its structure. Below the car bolster is the male center plate 8 which penetrates the female plate and is centered by the wall 2.

The male center plate 8 is concentric with the wall 2 so that, with the car upright, there is full bearing contact between the horizontal load bearing surfaces of the center plates.

Extending downwardly from the car bolster is a pad 9 on each side of the center plate. The pad 9 carries an auxiliary wear plate 10 in contact with the wear plate 5. The contact planes of the auxiliary, stabilizing plates 5 and 10 are co-planar with the load supporting planes of the center plates. These wear plates extend across the bolster and their length in a direction parallel with the car is less than their width in a direction parallel with the bolster. Since these plane surfaces are parallel, the car may rotate about the central axis of the center plate without disengagement of the loaded surfaces except that a portion of a car wear plate may slide out of contact with a portion of the opposed wear plate on the truck bolster.

The usual side bearing much nearer to the truck side frame than the auxiliary stabilizing members includes a housing 11 on the truck bolster supporting a roller 11a in opposition to but normally out of contact with the body 12 on the car bolster. Under ordinary running conditions there is substantial clearance between the body 12 and the roller 11a so that only in extreme conditions does the side bearing positively stop relative rocking of the car and the truck.

As the car tilts or rocks toward but out of contact with the side bearings, the point of application of the load between the car and the truck moves away from the vertical axis of the center plates which normally coincides with the center of gravity of the car. The result of this increasing of the distance between the point of load application on the truck and the center of gravity tends to stabilize the car.

Thus the weight of the car applied along the axis of the center plates exerts an anti-tilting effect upon the car through the lever arm equal to the distance between the central axis and the point of application of the load on the heavy side auxiliary pad. This force goes into effect immediately upon tilting of the car which leaves the load from the center plate and from the high side or light side auxiliary pad to apply the entire load on the heavy side pad.

The wear plates have been illustrated as being co-planar with the center plate. They may, of course, be above or below the center plate. It is convenient to have them co-planar but the essential thing is that they must be parallel because otherwise rotation of the car with respect to the truck bolster would be inhibited.

I claim:

1. A railroad car, a car truck, a truck bolster, and a car bolster, rigid circular center plates between them, having opposed horizontal, plane, load bearing surfaces, side bearings between the bolsters on each side of the truck, including elements normally out of contact with one another, rigid auxiliary stabilizing pads, carried by the bolster on opposite sides of the center plates between the plates and the side bearings, having opposed horizontal plane load bearing surfaces extending transversely of the bolster a distance such that the pad bearing surfaces remain in load carrying contact as the bolsters rotate with respect to one another about the vertical axes of the center plates, the load carried by the stabilizing pad on opposite sides of the center plates remaining substantially equal when the car is upright, the opposed load bearing surfaces of center plates and stabilizing pads being held in contact by gravity alone.

2. The device of claim 1 characterized by the fact that as the car tilts toward contact of the opposed side bearing elements on the heavy side of the truck, the entire car load is concentrated on the load bearing surfaces of the auxiliary pad on the heavy side and as the opposed load bearing surfaces of the center plates and of the high side auxiliary pads separate the weight of the car exerts a downward anti-tilting effect through a lever arm equal to the distance between the point of load application on the heavy side auxiliary pad and the vertical axis of the center plate.

References Cited

UNITED STATES PATENTS

| | | | |
|---|---|---|---|
| 1,079,318 | 11/1913 | Stevens | 105—200 |
| 1,814,232 | 7/1931 | Sturrock | 105—200 XR |
| 1,993,104 | 3/1935 | Lamont | 105—200 |
| 3,255,712 | 6/1966 | Barber | 308—138 XR |

ARTHUR L. LA POINT, *Primary Examiner.*